(No Model.)
A. STROMBERG.
MACHINE FOR SLICING SUGAR CANE.
No. 341,959. Patented May 18, 1886.
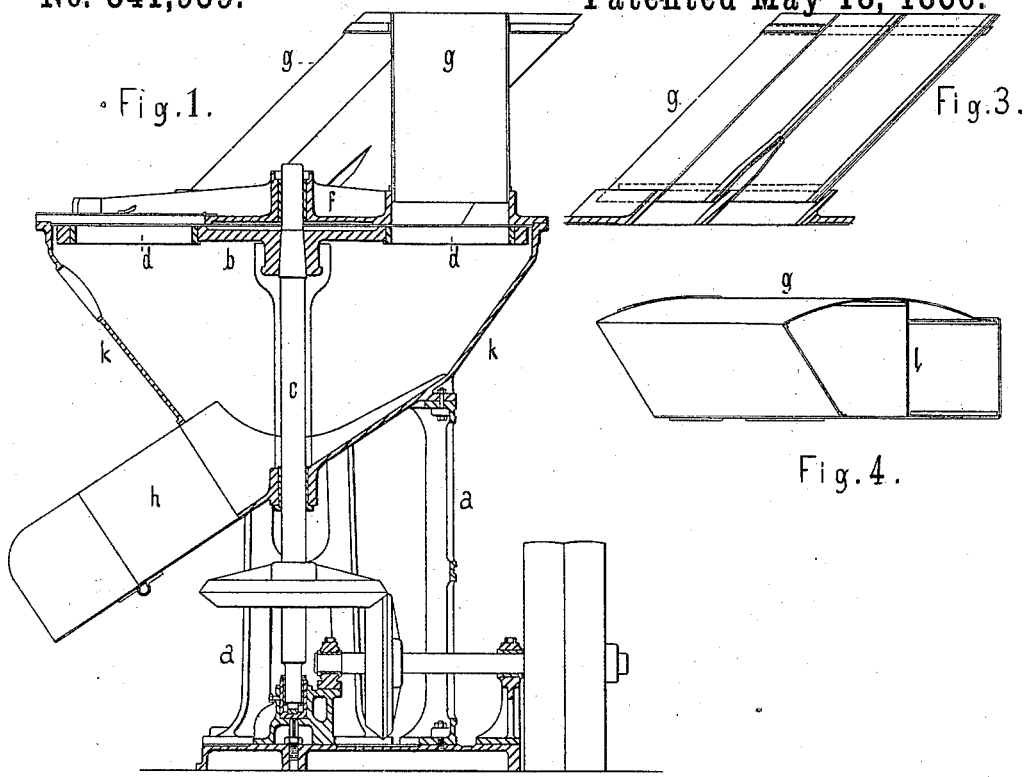
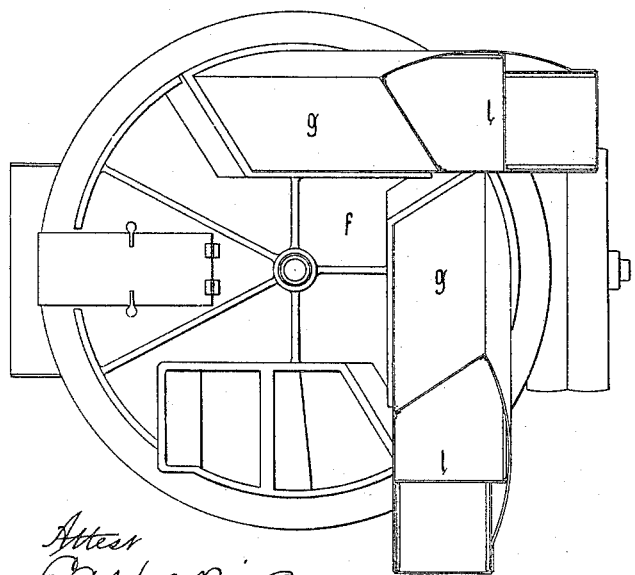
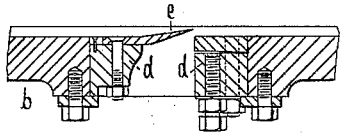

United States Patent Office.

ADOLPHUS STROMBERG, OF SUDENBURG, NEAR MAGDEBURG, PRUSSIA, ASSIGNOR TO THE SUDENBURGER MASCHINENFABRIK UND EISENGIES-SEREI AKTIENGESELLSCHAFT, OF MAGDEBURG, GERMANY.

MACHINE FOR SLICING SUGAR-CANE.

SPECIFICATION forming part of Letters Patent No. 341,959, dated May 18, 1886.

Application filed February 6, 1886. Serial No. 191,034. (No model.) Patented in France October 25, 1884, No. 165,012; in Belgium October 25, 1884, No. 66,696, and in England October 31, 1884, No. 14,402.

*To all whom it may concern:*

Be it known that I, ADOLPHUS STROMBERG, a subject of the King of Prussia, and residing at Sudenburg, near Magdeburg, Kingdom of Prussia, German Empire, have invented an Improved Machine for Slicing Sugar-Cane, (for which Letters Patent have been granted in France October 25, 1884, No. 165,012; in Belgium October 25, 1884, No. 66,696, and in Great Britain October 31, 1884, No. 14,402,) of which the following is a specification.

My invention consists in an improved machine for cutting sugar-cane slantwise into slices adapted to extract therefrom the saccharine juice by diffusion, or which are subjected, instead of the undivided cane, to the action of a roller-mill for the purpose of obtaining a greater yield of juice.

The machine is shown on the annexed sheet of drawings by Figure 1 in vertical section, and by Fig. 2 in plan, one of the hoppers $g$ being removed. Fig. 3 is a sectional elevation, and Fig. 4 a plan, of one of the hoppers. Fig. 5 shows in section and to a larger scale a portion of the rotating disk $b$.

The machine consists of a frame, $a$, in which are mounted a vertical shaft, $c$, and mechanism for rotating the same. Besides, the said frame carries a conical receiver for the cane-slices, $k$, and a horizontal plate, $f$, fixed to the top of the latter. Below the plate $f$ is keyed on the shaft $c$ a disk, $b$, provided with slits, to the edges of which cutters $e$, Fig. 5, are fixed. Preferably, however, the cutters are not attached to the body of the disk $b$, but to frames $d$, inserted into the same and arranged to be easily removed therefrom.

The plate $f$ has one or more apertures, to which are fitted inclined hoppers $g$, serving to conduct the cane to the cutters. These hoppers are with advantage constructed in the form shown by the drawings, and provided with a partition-plate, $l$. The cane, introduced by hand into the said hoppers, presses by its weight against the disk $f$, and is divided slantwise by the cutters rotating with the said disk. The slices issue from the machine by a chute, $h$.

I am aware that it has been proposed to construct a slicing-machine of a horizontal rotary disk having cutters secured thereto and one or more superposed vertical hoppers; but such is not the equivalent of my invention. Such a machine is not adapted for cutting sugar-cane in the manner hereinbefore described.

I am also aware that it has been proposed to construct a machine for slicing sugar-cane of a disk carrying the cutters and rotating in a vertical plane, the cane being carried up to the cutters between two intermittently-moving endless belts placed at an inclined angle; but this is not the equivalent of my invention, and I hereby disclaim any feature or features which my invention may possess in common therewith.

I claim—

In a machine for slicing sugar-cane, the combination, with a horizontal rotating disk, $b$, having one or more cutters, $e$, fixed thereto, of one or more superposed inclined hoppers, $g$, through which the cane passes by gravity, substantially as set forth.

In testimony whereof I have hereunto set my hand in the presence of two subscribing witnesses.

ADOLPHUS STROMBERG.

Witnesses:
 HENRY SPRINGMANN,
 B. ROI.